(12) United States Patent
Zuchlewski

(10) Patent No.: US 9,383,248 B1
(45) Date of Patent: Jul. 5, 2016

(54) BALL FLOAT ALARM

(71) Applicant: Kenneth Zuchlewski, Tonawanda, NY (US)

(72) Inventor: Kenneth Zuchlewski, Tonawanda, NY (US)

( * ) Notice: Subject to any disclaimer, the term of this patent is extended or adjusted under 35 U.S.C. 154(b) by 89 days.

(21) Appl. No.: 14/577,399

(22) Filed: Dec. 19, 2014

(51) Int. Cl.
*G08B 21/00* (2006.01)
*G01F 23/72* (2006.01)
*G08B 21/18* (2006.01)

(52) U.S. Cl.
CPC .............. *G01F 23/72* (2013.01); *G08B 21/182* (2013.01)

(58) Field of Classification Search
CPC ....... G01F 23/74; G01F 23/72; F04B 49/025; H01H 35/18
USPC .............. 340/623, 618, 624, 625, 612, 686.1, 340/687; 73/1.73, 290 R, 305, 307, 309, 73/322.5; 116/109, 110
See application file for complete search history.

(56) References Cited

U.S. PATENT DOCUMENTS

| 3,259,714 | A | | 7/1966 | St. Coeur |
| 3,545,272 | A | | 12/1970 | McGill |
| 3,857,359 | A | * | 12/1974 | Ward ..................... B63B 39/12 116/110 |
| 4,021,144 | A | | 5/1977 | Matsusaka |
| 4,629,841 | A | | 12/1986 | Riback et al. |
| 8,967,191 | B1 | * | 3/2015 | DeVerse .................. E04H 4/12 137/412 |

\* cited by examiner

*Primary Examiner* — Toan N Pham
(74) *Attorney, Agent, or Firm* — Vincent G. LoTempio; Kloss, Stenger & LoTempio; David T. Stephenson

(57) ABSTRACT

A ball float alarm emits a signal when a liquid rises above a predetermined level inside a sump. The alarm is activated by conditions related to the rising and falling of the liquid in the cavity. The alarm emits a signal when the liquid rises above the predetermined level, and then powers off when the liquid falls beneath the predetermined level. A buoyant sphere is supported by a cable from above the cavity. The alarm floats on the liquid when the liquid level is above a predetermined level. When the sphere floats, the cable is lax. The lax cable causes a magnet and an alarm contact inside the alarm to pivotally join, and thus actuate an alarm signal. When the liquid falls below the predetermined level in the cavity, the cable becomes lax, causing the alarm contact to pivot distally from the magnet, which shuts off the alarm.

20 Claims, 6 Drawing Sheets

BALL FLOAT ALARM

FIELD OF THE INVENTION

The present invention relates generally to a ball float alarm. More so, a ball float alarm that is activated by conditions related to the rising and falling of a liquid in a sump, and specifically when a magnet and an alarm contact inside a buoyant sphere pivot proximally to each other based on the rising and falling of the sphere relative to the liquid level.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known that a sump is a low space that collects any often-undesirable liquids such as water or chemicals. A sump can also be an infiltration basin used to manage surface runoff water and recharge underground aquafer. One common example of a sump is the lowest point in a basement, into which flows water that seeps in from outside. Typically, a sump pump is used to pump the water outside of the house.

It is known that use of sump pumps has become commonplace in many homes, especially those in known flood areas. Sump pumps are typically located in a sump or pit that is excavated at or about the lowest point of the house. Sump pumps are often of the submersible-type, meaning that they operate within a pool of water; which has the added effect of keeping the pump motor cool while running.

In many instances, a pump would be able to draw the water out of the sump and into either the waste water system or to an ejection point away from the foundation of the structure. However, this requires that the pump must either be set to run continuously or activated by some means that can detect the presence and rising of water. It is known that a continuously running pump wastes energy and runs the risk of burning out from constant action and its activity of removing water in the sump can cause burnout by the removal of all of its surrounding cooling pool of water. It is preferable, therefore, to have a means to detect the presence of water and activate the pump thereafter. Ideally the pump is allowed to draw the water down to a safe point and then deactivate the pump.

The sump is typically below floor level. Consequently, when there is an overflow of water, the sump pump is submersed in the water. This can be problematic. Additionally, sump pumps typically are placed into operation and left alone to operate only on those rare occasions when water enters into a foundation area. Oftentimes a pump can be inactive during an entire dry season; further the pump and switch are typically located in areas of the structure that are dirty, damp or otherwise not conducive to the maintenance of electrical switches.

It is known that switches activate the pump at appropriate times during a rising water event. Included in presently available switches are floating switches that trigger the activation of a pump upon rising to a certain level and shutting off the pump upon sinking back to a safer level; or switches floating within a tethered float. Tethered floats typically have a mercury-type switch that is activated and deactivated by the change in angle of the float, returning to a shut off position upon the return of the tethered float to its at rest position.

Often, when a pump is shut down too quickly there is a tendency to have the pump activate and shut down often particularly in a rapid water rise cycle, such that the switch and pump are activated and deactivated too often. If the pump is shut down too early the level of water remains high enough that a small influx of water subsequent reactivates the pump quickly, the pump then removes a small amount of water again before it is deactivated again. This cycle is deleterious to the pump and switch mechanism.

Other proposals have involved automated regulation of a sump pump. The problem with these devices is that they shut down too quickly, don't trigger an alarm, or have unreliable switching mechanisms. Thus, an unaddressed need exists in the industry to address the aforementioned deficiencies and inadequacies. Even though the above cited methods for a sump pump meets some of the needs of the market, a ball float alarm for triggering an alarm for a sump based on the orientation and height of the alarm relative to the sump, so as to indicate a pump failure or actuate a pump, is still desired.

SUMMARY OF THE INVENTION

The present invention is directed to a ball float alarm that emits a signal when a liquid rises above a predetermined level inside a cavity, such as a sump. The alarm is activated by conditions related to the rising and falling of the liquid in the cavity. In one embodiment, a rising liquid level above a predetermined level in a sump is indicative of a pump failure, since the pump is not discharging a sufficient amount of liquid out of the sump. Thus, based on the orientation and height of the alarm relative to the cavity, a signal is emitted when the liquid rises above the predetermined level, and then powers off when the liquid falls beneath the predetermined level. In one embodiment, the signal may be transmitted to a zone at an alarm system in a person's home to indicate the rise or fall of the liquid level. It is also significant to note that an alarm system output, separate from the alarm, would actually generate the audible sound in response to the signal.

In some embodiments, the alarm is supported by a cable from above the cavity. The alarm is also sufficiently buoyant to float on the liquid inside the cavity. Thus, the alarm may float on the liquid, or hang suspended from the cable, depending on the level of the liquid. The length of the cable is configured such that the cable supporting the alarm remains substantially lax when the liquid level in the cavity is above the predetermined level. This is because the alarm receives support while floating on the rising liquid level. However, when the liquid falls below the predetermined level in the cavity, the alarm loses support from the liquid and hangs from the cable, which becomes substantially taut due to the weight of the alarm. The lax cable causes a switch inside the alarm to actuate a signal that generates an audible sound or actuates a pump.

In one embodiment, the alarm comprises a sphere. The sphere is substantially hollow for containing the mechanisms of the alarm and providing buoyancy for floating on the liquid. The sphere can bisect into a pair of half spheres, with each half sphere having a peripheral ridge. A cable suspends from above the sphere. The cable has a distal end that attaches to a predetermined point along the cavity above the sphere. The cable also has a proximal end that enters an interior region of the sphere through a hermetically tight channel, such as a bushing or seal. The proximal end terminates at an alarm contact. In one embodiment, the alarm contact is actuated to provide a signal upon engagement with a magnet.

A generally elongated bar extends across the sphere, fastening on the peripheral ridges. Thus, by fastening to the peripheral ridges, the bar moves in conjunction with the sphere. The bar comprises a bar pivot end and a bar signal end.

The bar pivot end has a protruding pivot knuckle that provides pivotal support. The bar signal end has an alarm contact fastener that receives and secures the alarm contact from the proximal end of the cable. In some embodiments, the interior region of the sphere includes a counterweight to maintain the sphere at a generally vertical orientation relative to the cavity. In one embodiment, the counterweight attaches to the bar signal end so as to bias the bar signal end towards a lower end of the sphere. Thus, the counterweight helps orients the bar vertically when the cable is lax.

In some embodiments, an axis arm works in conjunction with the bar to generate the signal based on the laxness or tautness of the cable. The axis arm comprises an arm pivot end that pivotally joins with the bar pivot end. The arm pivot end may include an aperture that receives the pivot knuckle. In this arrangement, the pivot knuckle rotates inside the aperture to enable the bar to pivot with the sphere. In this manner, the axis arm and the bar may pivot in relation to each other based on the movements of the sphere; whereby the bar moves in conjunction with the sphere, and the axis arm remains in a vertical position independent of movements by the sphere. The axis arm also includes an arm signal end. The arm signal end comprises a magnet fastener that receives and secures a magnet.

When the liquid is below the predetermined level in the cavity, the sphere remains suspended from the cable (low liquid level), and the cable is taut. Consequentially, the proximal end of the cable pulls on the attached bar signal end, causing both the sphere and the attached bar to rotate together. This pivoting motion moves the alarm contact distally from the magnet, and thus the signal is not actuated.

When liquid begins to fill the cavity, the sphere floats on the liquid and the cable becomes lax. In this lax position, the sphere has no support and the counterweight seeks equilibrium, which causes the sphere and the connected bar to rotate towards the vertical orientation. This rotation pivots the bar signal end of the bar proximally to the magnet, causing the signal to actuate.

It is one objective of the present invention to provide a ball float alarm that is activated by conditions related to the rising and falling of the liquid in the sump.

It is another objective to create relative motion between the bar and the axis arm such that the magnet and the contact alarm are pivotally joined and separated.

Yet another objective is to provide a counterweight in the sphere that maintains a center of gravity at a point generally opposite the cable.

Yet another objective is to provide an easy to install ball float alarm that hangs down from the top of a sump.

Yet another objective is to adjust the length of the cable to form an acceptable liquid level in the sump.

Yet another objective is to provide an inexpensive alarm that signals when the liquid level has exceeded the predetermined level with an audible signal.

Yet another objective is to transmit a signal to a zone at an alarm system in a person's home to indicate the rise or fall of the liquid level.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The present invention and the manner in which it may be practiced is further illustrated with reference to the accompanying drawings wherein:

FIG. 1A is the ball float alarm disassembled into separate components, and FIG. 1B is the ball float alarm fully assembled, in accordance with an embodiment of the present invention;

Like reference numerals refer to like parts throughout the various views of the drawings.

DETAILED DESCRIPTION OF THE INVENTION

Figure 1A:
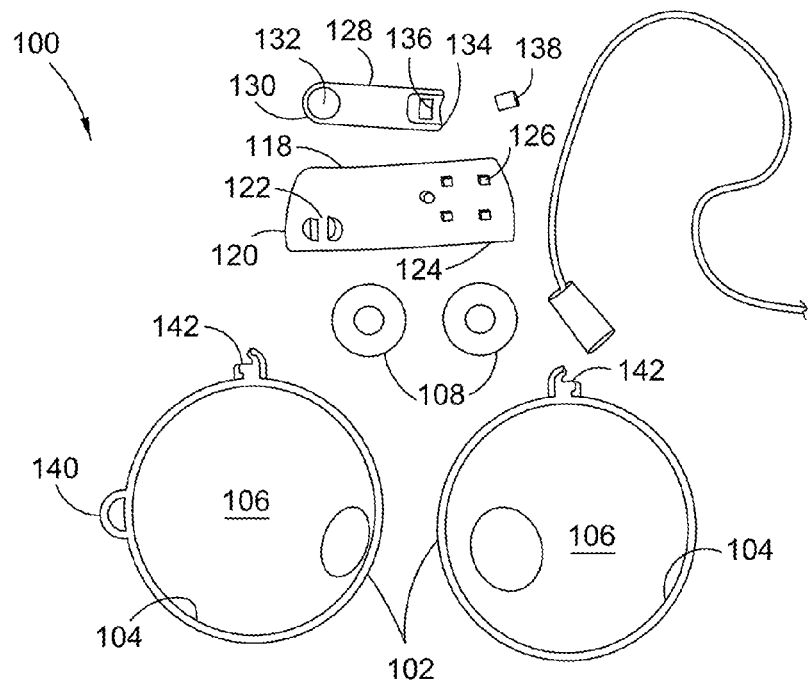
FIGS. 1A and 1B are perspective views of an exemplary ball float alarm, where

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1A. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112.

In one embodiment of the present invention, presented in FIGS. 1A-6, a ball float alarm 100 emits a signal 152 to indicate when a predetermined level 148 of a liquid 146 has been reached inside a cavity 150. The cavity 150 may include a sump in a building. The signal 152 may include an audible sound to indicate when the sump is filling with the liquid 146, i.e., pump failure. In one embodiment, the signal 152 may be transmitted to a zone at an alarm system in a person's home to indicate the rise or fall of the liquid level. In some embodiments, the alarm 100 is operable when a liquid 146 rises above a predetermined level 148 inside the cavity 150. The predetermined level 148 may be determined prior to operating the alarm 100. Thus, the signal 152 is activated by conditions related to the rising and falling of the liquid 146 in the cavity 150. It is significant to note that an alarm system output, separate from the alarm 100, would actually generate the audible sound in response to the signal 152.

In one possible embodiment, a rising waterline above the predetermined level 148 in a sump is indicative of a pump failure, since the pump is not discharging a sufficient amount of water out of the sump. Thus, based on the orientation and height of the alarm 100 relative to the sump, a signal 152 is emitted when the waterline rises above the predetermined level 148, and the alarm 100 powers off the signal 152 when the waterline falls beneath the predetermined level 148.

Those skilled in the art, in light of the present teachings, will recognize that a specific zone on a security system will be designated for reporting a pump failure to an alarm monitoring company, who in turn, will notify a technician to address the problem. The security system has multiple zones, i.e. Burglary, fire, carbon monoxide and of course, sump pump failure to name a few. The signal 152 generated by the alarm 100 may be sent to the sump pump failure zone.

In some embodiments, the alarm 100 is supported by a cable 110 from above the cavity 150. The cable 110 may include, without limitation, a tethering wire, a string, a pole, and a chain. The alarm 100 comprises a sphere 102 containing components of the alarm 100. The sphere 102 is sufficiently buoyant to float on the liquid 146 inside the cavity 150. Thus, the alarm 100 may float on the liquid 146, or hang suspended from the cable 110, depending on the level of the liquid 146. The length of the cable 110 is configured such that the cable 110 supporting the sphere 102 remains substantially lax when the liquid 146 in the cavity 150 is above the predetermined level 148, and taut when the liquid 146 falls below the predetermined level 148. This is because the alarm 100 receives support while floating on the rising liquid 146, and thus is not supported by the cable 110. However, when the liquid 146 falls below the predetermined level 148 in the cavity 150, the alarm 100 loses support from the liquid 146 and hangs from the cable 110, which becomes substantially taut due to the weight of the alarm 100.

As referenced in FIG. 1A, the alarm 100 comprises a sphere 102. The sphere 102 is substantially hollow for containing the mechanisms of the alarm 100. A cable 110 suspends from above the sphere 102. The cable 110 has a distal end 116 that attaches to a predetermined point above the sphere 102. The distal end 116 may attach at the opening of the cavity 150, above the opening of the cavity 150, or along the sidewalls of the cavity 150. The signal 152 may include a mechanism designed to reverberate sound. The cable 110 also has a proximal end 112 that enters an interior region 106 of the sphere 102 through a hermetically tight channel 142, such as a bushing or seal. The proximal end 112 of the cable 110 terminates at an alarm contact 114. In one embodiment, the alarm contact 114 is actuated to provide a signal 152 upon engagement with a magnet 138. For example, the alarm contact 114 includes a reed switch that triggers the signal 152 when affected by a magnetic field. However, in other embodiments, any number of signaling mechanisms may be used.

In some embodiments, the interior region 106 of the sphere 102 bisects into a pair of half spheres. Each half sphere comprises a peripheral ridge 104. The peripheral ridge 104 provides a snap-lock mechanism for separating and mating the half spheres. The peripheral ridge 104 also forms a support brace for fastening the mechanisms of the alarm 100. In some embodiments, a generally elongated bar 118 extends across the sphere 102. The bar 118 fastens onto the peripheral ridges 104. In some embodiments, an adhesive may help maintain the bar 118 on the peripheral ridge 104. Thus, by fastening to the peripheral ridge 104, the bar 118 moves in conjunction with the sphere 102. For example, when the sphere 102 rotates in a clockwise direction, the bar 118 also rotates in a clockwise direction; when the sphere 102 bobs on the liquid 146, the bar 118 bobs in the same oscillating manner.

In some embodiments, the bar 118 is defined by a bar pivot end 120 and a bar signal end 124. The bar pivot end 120 has a protruding pivot knuckle 122 that provides pivotal support. The bar signal end 124 has an alarm contact fastener 126 that receives and secures the alarm contact 114 from the proximal end 112 of the cable 110. The alarm contact fastener 126 may include four grip members that are sized and dimensioned to securely hold an alarm contact 114 having dimensions of about ⅜"×¾". However, in other embodiments, any type of fastening mechanism may be used.

In some embodiments, the interior region 106 of the sphere 102 includes a counterweight 108 to maintain the sphere 102 at a generally vertical orientation relative to the cavity 150. The counterweight 108 serves to localize the center of gravity at a point generally opposite the cable 110. In one embodiment, the counterweight 108 attaches to the bar signal end 124 so as to bias the bar signal end 124 towards a lower end of the sphere 102. Thus, the counterweight 108 helps orients the bar 118 vertically when the cable 110 is lax. In one embodiment, the counterweight 108 comprises two circular weights that weigh about 0.2 ounces each. Though in other embodiments, any object having weight may be used as a counterweight 108.

Figure 1B:
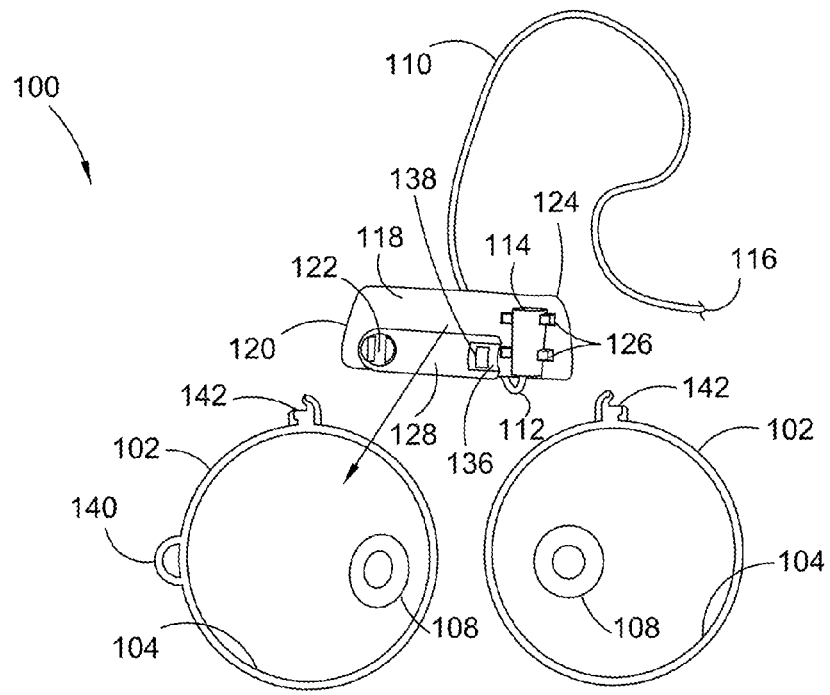

As shown in FIG. 1B, an axis arm 128 works in conjunction with the bar 118 to generate the signal 152 based on the laxness or tautness of the cable 110. The axis arm 128 comprises an arm pivot end 130 that pivotally joins with the bar pivot end 120. The arm pivot end 130 may include an aperture 132 that receives the pivot knuckle 122. In this arrangement, the pivot knuckle 122 is rotatable inside the aperture 132 to enable the bar 118 to pivot with the sphere 102. Thus, the axis arm 128 and the bar 118 may pivot in relation to each other based on the movements of the sphere 102; whereby the bar 118 moves in conjunction with the sphere 102, and the axis arm 128 remains in a vertical position independent of movements by the sphere 102. The axis arm 128 also includes an arm signal end 134. The arm signal end 134 comprises a magnet fastener 136 that receives and secures a magnet 138. The magnet fastener 136 may include a slot sized and dimensioned to frictionally receive the magnet 138. The magnet 138 serves to diffuse a magnetic field that has sufficient strength to actuate the reed switch or other switching mechanism in the alarm contact 114 when they are proximal to each other. The magnet 138 also forms a weight to the arm signal end 134 to help maintain the vertical orientation.

Figure 2:
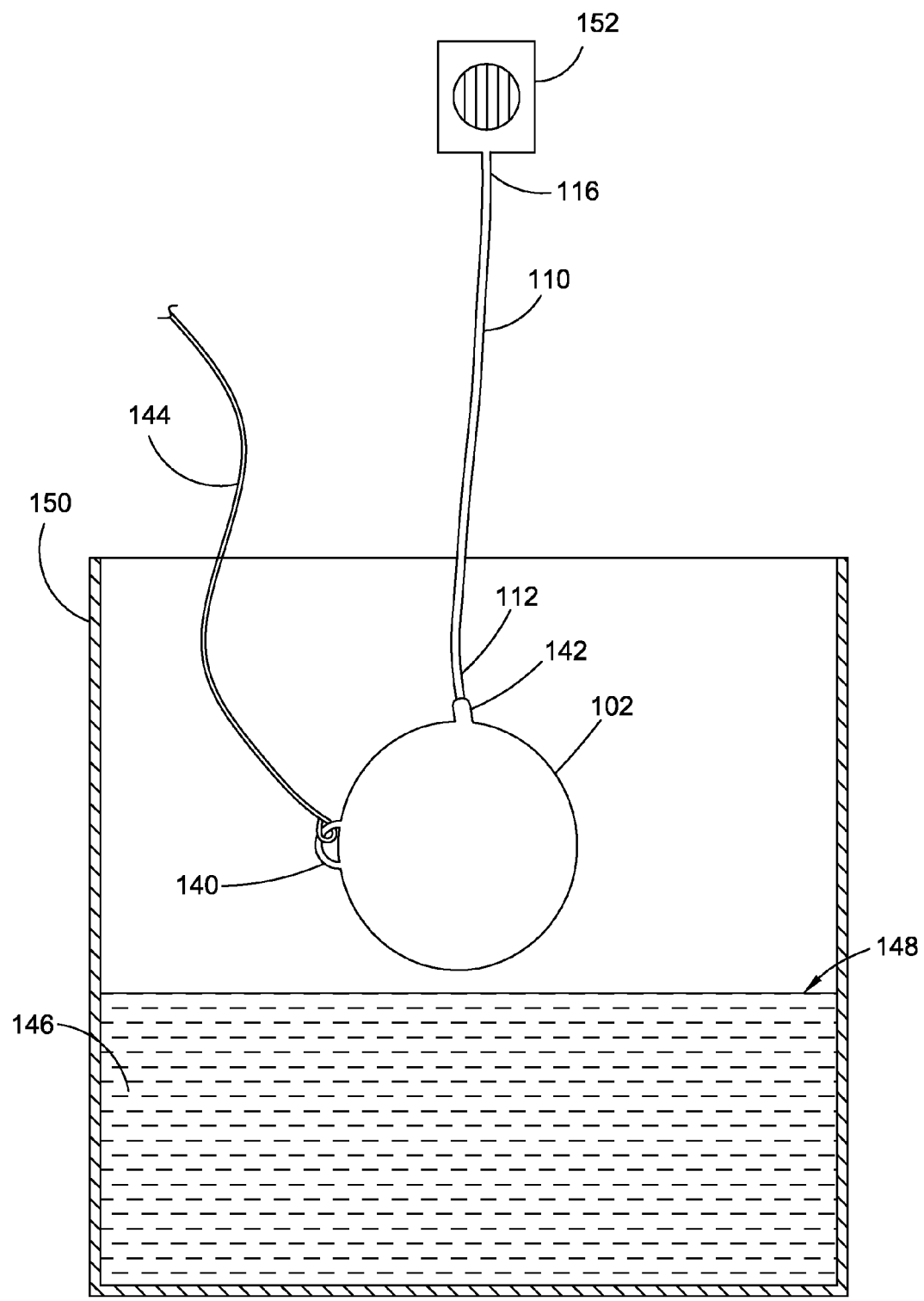
FIG. 2 is a side view of the ball float alarm suspended above a predetermined level for a liquid, where an exemplary cable is substantially taut, in accordance with an embodiment of the present invention.
Figure 3:
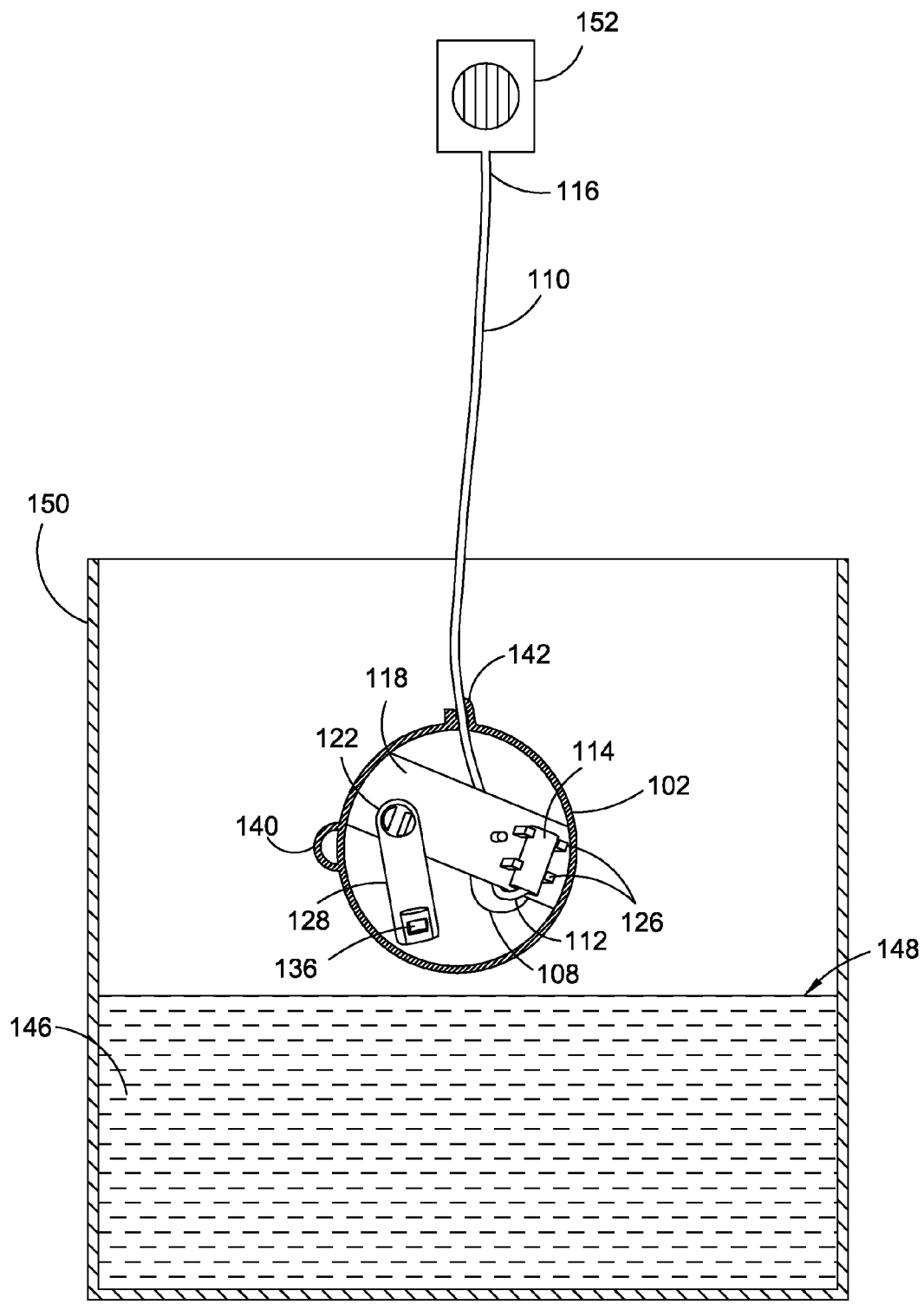
FIG. 3 is a sectioned view of the ball float alarm suspended above a predetermined level for the liquid, where the cable is substantially taut, in accordance with an embodiment of the present invention.

Turning now to FIG. 2, when the liquid 146 is below the predetermined level 148 in the cavity 150, the sphere 102 remains suspended from the cable 110 (low liquid level), and the cable 110 is taut. Consequentially, the proximal end 112 of the cable 110 pulls on the attached bar signal end 124, causing both the sphere 102 and the attached bar 118 to rotate together. This pivoting motion pivots the alarm contact 114 approximately 90° away from the magnet 138. It is significant to note that the axis arm 128 does not pivot with the sphere 102 and the bar 118, but rather remains in a neutral, generally vertical position relative to the bar 118 (FIG. 3). This is because the arm pivot end 130 rotates inside the pivot knuckle 122 to maintain the axis arm 128 in the vertical orientation. Additionally, the magnet 138 helps maintain the axis arm 128 in the vertical position because of the force of gravity pulling down on the magnet 138 forms a weight. Thus, the magnet 138 on the arm signal end 134 and the alarm contact 114 on the bar signal end 124 are distal to each other, and the alarm contact 114 is not actuated.

Figure 4:
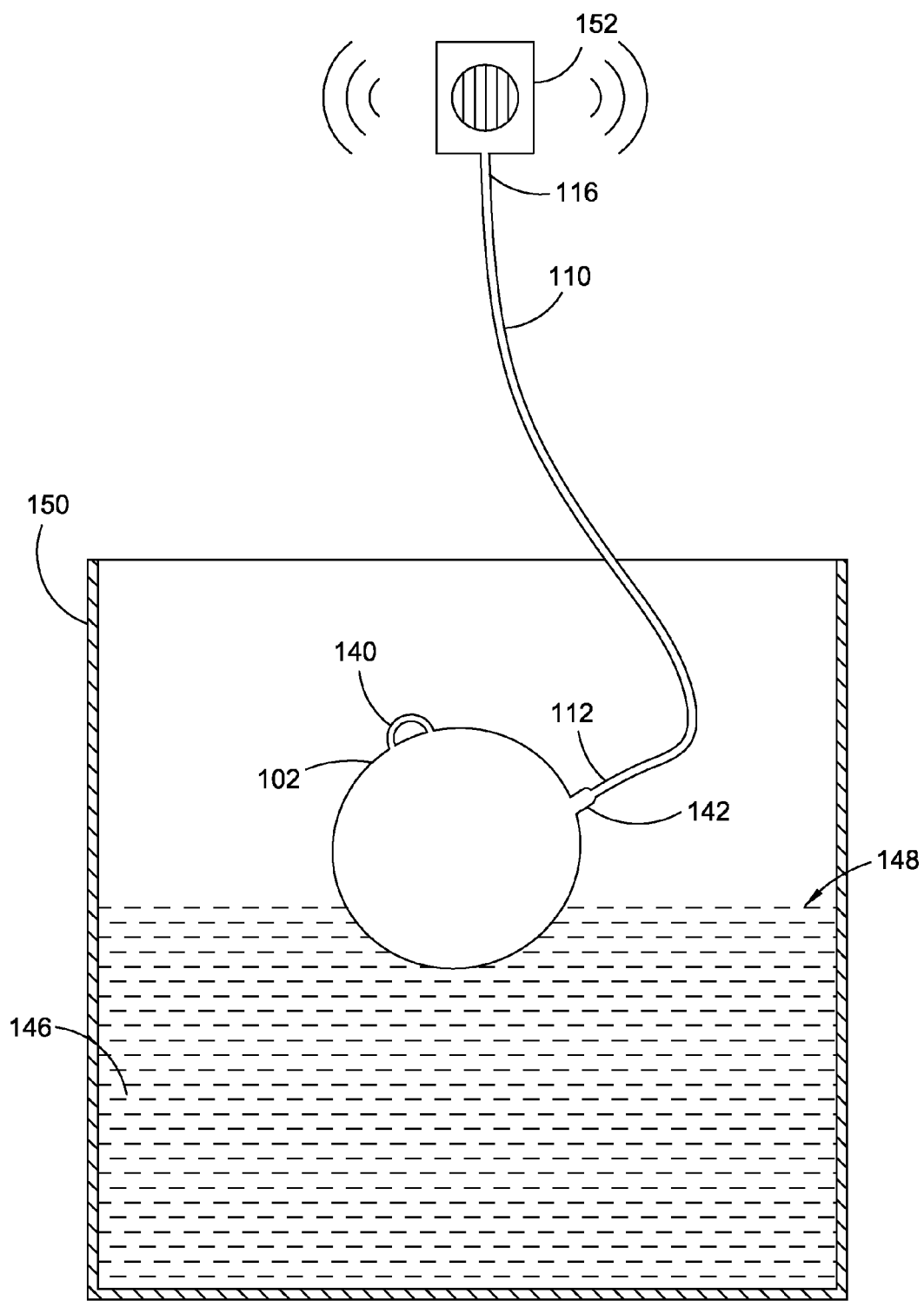
FIG. 4 is a side view of the ball float alarm floating on a predetermined level of the liquid, where the cable is substantially lax and the signal is actuated, in accordance with an embodiment of the present invention.

As referenced in FIG. 4, when the liquid 146 begins to fill the cavity 150, the sphere 102 floats on the liquid 146 and the cable 110 becomes lax, i.e., pump failure. In this lax position, the sphere 102 has no support and the counterweight 108 seeks equilibrium, which causes the sphere 102 and the connected bar 118 to rotate towards the vertical orientation. This rotation pivots the bar signal end 124 of the bar 118 about 90° to a parallel position with the magnet 138 on the arm signal end 134. In this position, the magnet 138 and the alarm contact 114 are proximal to each other, and thus, the alarm contact 114 is actuated. In one embodiment, a reed switch inside the contact alarm 100 may open or close in response to the magnetic field from the magnet 138 to generate the signal 152.

Figure 5:
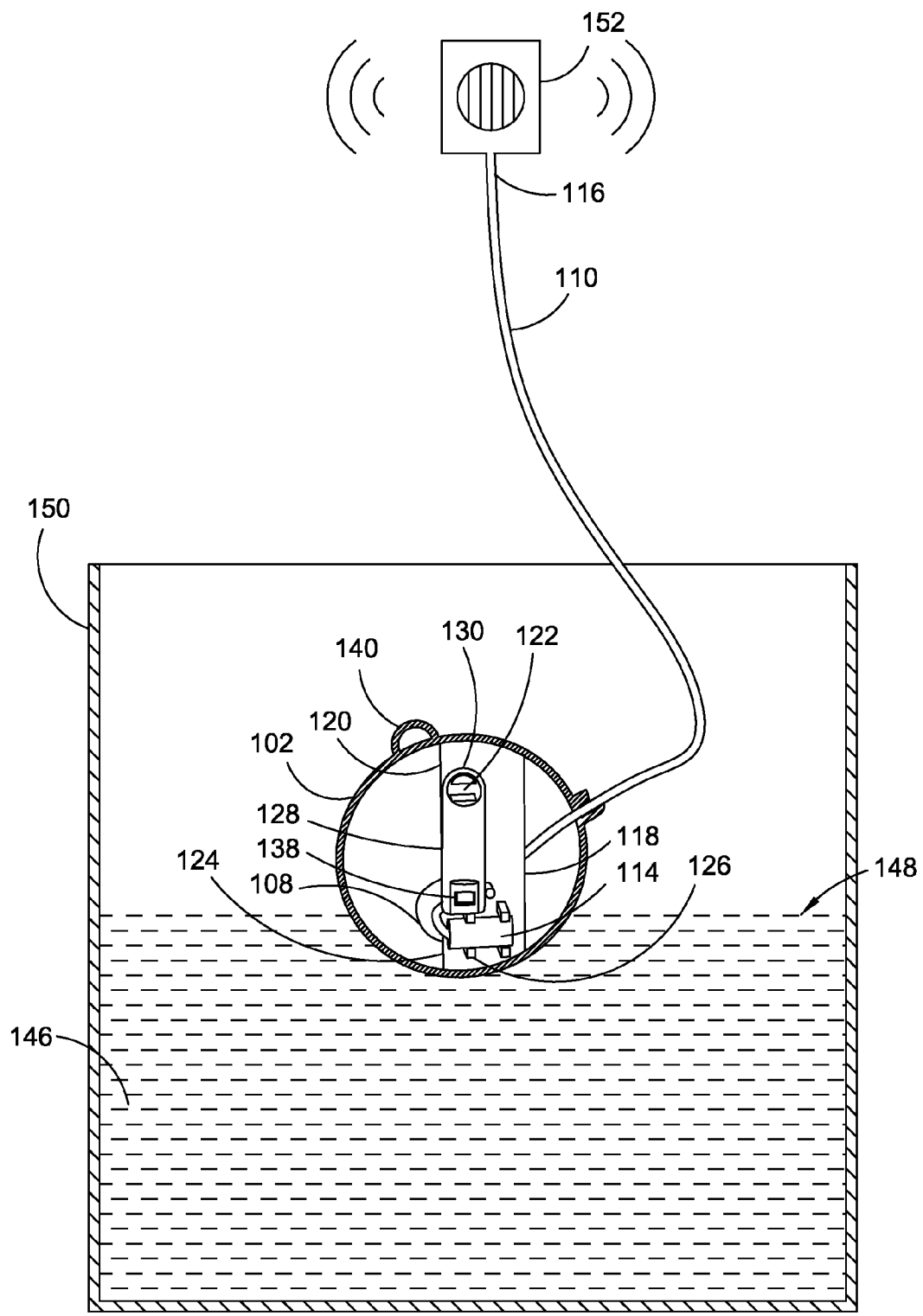
FIG. 5 is a sectioned view of the ball float alarm floating on a predetermined level of the liquid, where the cable is substantially lax and the signal is actuated, in accordance with an embodiment of the present invention.

It is significant to note that the mass of the bar 118 while pivoting, is sufficient to maintain the bar 118 perpendicular to the axis arm 128 until sufficient torque is applied by the cable 110 against the sphere 102 to force the bar 118 to pivot towards the axis arm 128 and assume the vertical orientation. From this vertical orientation of the bar 118, an audible signal may be generated to indicate the liquid 146 has surpassed the predetermined level 148 in the cavity 150 (FIG. 5).

Figure 6:
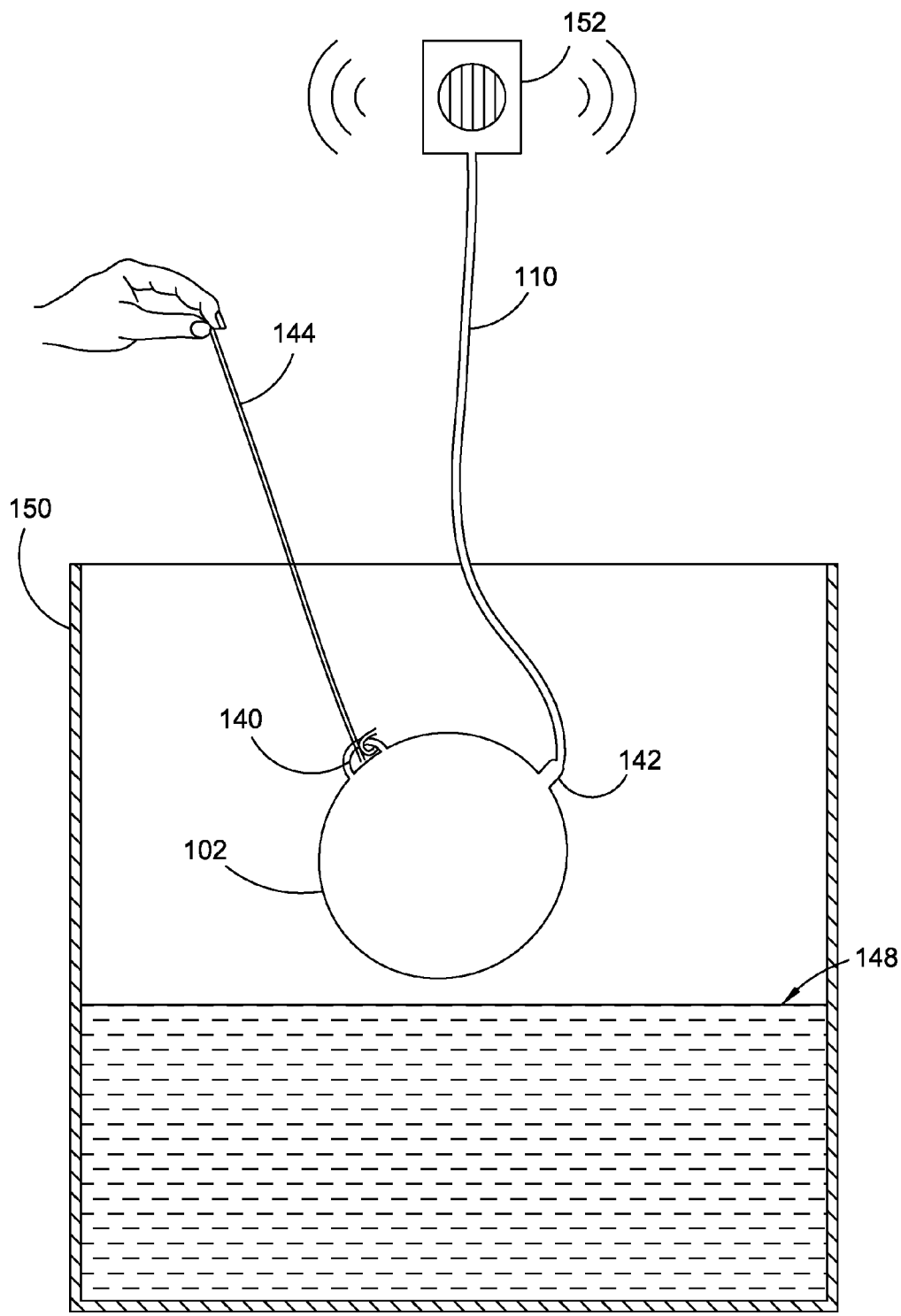
FIG. 6 is a side view of the ball float alarm floating supported above the predetermined level of the liquid by a test line, where the cable is substantially lax and the signal is actuated, in accordance with an embodiment of the present invention.

FIG. 6 illustrates the alarm 100 being tested with a test line 144. By pulling on the test line 144 and the attached sphere 102, the cable 110 is made to be lax. As discussed above, the substantially lax cable 110 enables the bar signal end 124 to pivot to a proximal position to the arm signal end 134, such that the magnet 138 actuates the alarm contact fastener 126. The test line 144 attaches to the sphere 102 at an external loop 140 on the sphere 102. Those skilled in the art will recognize that regular testing of the alarm 100 is beneficial to ensure batteries, wiring, and corrosion have not adversely affected the signal 152.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. An alarm for actuating a signal based on a level of a liquid in a cavity, the alarm comprising:
   a sphere, the sphere defined by a substantially hollow interior region, wherein the sphere is at least partially buoyant;
   a bar, the bar defined by a bar pivot end and a bar signal end, the bar configured to traverse the interior region of the sphere, the bar further configured to fasten to the interior region, wherein the bar moves in conjunction with the sphere;
   a cable, the cable defined by a proximal end and a distal end, the proximal end comprising an alarm contact, the alarm contact disposed to attach to the bar signal end;
   an axis arm, the axis arm defined by an arm pivot end and an arm signal end, the arm pivot end disposed to pivotally join with the bar pivot end, wherein the axis arm is configured to pivotally maintain a vertical orientation relative to the sphere and the bar, the arm signal end comprising a magnet, the magnet configured to actuate the alarm contact when positioned proximally to the bar signal end;
   wherein, if the cable is taut, the bar signal end and the attached alarm contact are pivotally pulled distally from the magnet;
   wherein if the cable is lax, the bar signal end and the attached alarm contact pivot are pivotally released proximally towards the magnet; and
   a counterweight, the counterweight disposed to attach to the bar signal end, the counterweight configured to localize a center of gravity on the sphere for biasing the bar signal end and the attached alarm contact proximally to the magnet.

2. The alarm of claim 1, wherein the alarm is a ball float alarm operable in a cavity.

3. The alarm of claim 1, wherein the sphere is sufficiently buoyant to float on a liquid in the cavity.

4. The alarm of claim 1, wherein the cable is taut when the liquid falls below a predetermined liquid level, and lax when the liquid rises above the predetermined liquid level.

5. The alarm of claim 1, wherein the sphere is configured to bisect into a pair of half spheres.

6. The alarm of claim 5, wherein the interior region of each half sphere comprises a peripheral ridge.

7. The alarm of claim 6, wherein the bar pivot end and the bar signal end are disposed to fasten to opposite sides of the peripheral ridge.

8. The alarm of claim 1, wherein the distal end of the cable is disposed to fasten above the alarm along a cavity.

9. The alarm of claim 1, wherein the alarm contact comprises a reed switch, the reed switch configured to open or close in response to a magnetic field generated by the magnet.

10. The alarm of claim 1, wherein the alarm contact has dimensions of ⅜ inches by ¾ inches.

11. The alarm of claim 1, wherein the bar pivot end comprises a pivot knuckle.

12. The alarm of claim 11, wherein the bar signal end comprises an alarm contact fastener.

13. The alarm of claim 12, wherein the alarm contact fastener is defined by four grip members configured to fasten the alarm contact.

14. The alarm of claim 13, wherein the arm pivot end comprises an aperture.

15. The alarm of claim 14, wherein the aperture is configured to enable passage of the pivot knuckle.

16. The alarm of claim 15, wherein the arm signal end comprises a magnet fastener.

17. The alarm of claim 16, wherein the magnet fastener is defined by a slot, the slot configured to frictionally receive the magnet.

18. The alarm of claim 1, wherein the counterweight comprises two counterweights, each counterweight weighing 0.2 ounces.

19. The alarm of claim 1, wherein the sphere comprises an external loop for fastening a test line.

20. An alarm for actuating a signal based on a level of a liquid in a cavity, the alarm comprising:

a sphere, the sphere defined by a substantially hollow interior region, wherein the sphere is at least partially buoyant;

a bar, the bar defined by a bar pivot end and a bar signal end, the bar pivot end having a pivot knuckle, the bar signal end having an alarm contact fastener, the bar configured to traverse the interior region of the sphere, the bar further configured to fasten to the interior region, wherein the bar moves in conjunction with the sphere;

a cable, the cable defined by a proximal end and a distal end, the proximal end comprising an alarm contact, the alarm contact having a reed switch configured to open or close in response to a magnetic field, the alarm contact disposed to attach to the bar signal end;

an axis arm, the axis arm defined by an arm pivot end and an arm signal end, the arm pivot end having an aperture configured to enable passage of the pivot knuckle, the arm signal end having a magnet fastener, the arm pivot end disposed to pivotally join with the bar pivot end, wherein the axis arm is configured to pivotally maintain a vertical orientation relative to the sphere and the bar, the arm signal end comprising a magnet, the magnet configured to actuate the alarm contact when positioned proximally to the bar signal end;

wherein, if the cable is taut, the bar signal end and the attached alarm contact are pivotally pulled distally from the magnet;

wherein if the cable is lax, the bar signal end and the attached alarm contact pivot are pivotally released proximally towards the magnet; and a counterweight, the counterweight disposed to attach to the bar signal end, the counterweight configured to localize a center of gravity on the sphere for biasing the bar signal end and the attached alarm contact proximally to the magnet.

\* \* \* \* \*